No. 12,729. REISSUED DEC. 3, 1907.

T. H. GARLAND.

CAR VENTILATOR.

APPLICATION FILED SEPT. 23, 1907.

2 SHEETS—SHEET 1.

Witnesses
Milton Lenox
Albert N. Graves

Inventor
Thomas H. Garland
By Pliny B. Smith.
Attorney.

No. 12,729. REISSUED DEC. 3, 1907.

T. H. GARLAND.

CAR VENTILATOR.

APPLICATION FILED SEPT. 23, 1907.

2 SHEETS—SHEET 2.

Witnesses
Milton Lenoir
Albert N. Ingersoll

Inventor
Thomas H. Garland
by
Pliny B. Smith
Attorney.

UNITED STATES PATENT OFFICE.

THOMAS H. GARLAND, OF CHICAGO, ILLINOIS.

CAR-VENTILATOR.

No. 12,729. Specification of Reissued Letters Patent. Reissued Dec. 3, 1907.

Original No. 800,438, dated September 26, 1905, Serial No. 232,825. Application for reissue filed September 23, 1907. Serial No. 394,252.

*To all whom it may concern:*

Be it known that I, THOMAS HENRY GARLAND, a citizen of the United States, and a resident of Chicago, in the county of Cook and State of Illinois, have invented a new and Improved Car-Ventilator, of which the following is a full, clear, and exact description.

My invention relates to a ventilator for cars.

The objects thereof are to provide means for securing efficient ventilation irrespective of the direction of motion of the car and at the same time to prevent the possibility of the entrance of rain, snow, cinders, etc., through the ventilator.

Further objects of the invention will appear in the course of the subjoined description.

Reference is to be had to the accompanying drawings, forming a part of this specification, in which similar characters of reference indicate corresponding parts in all the figures.

Figure 1:
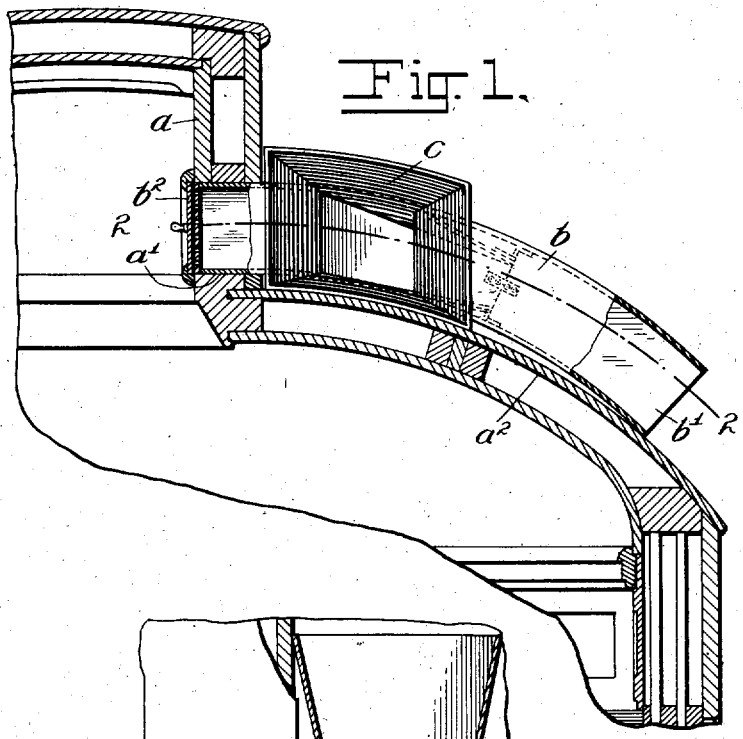
Figure 2:
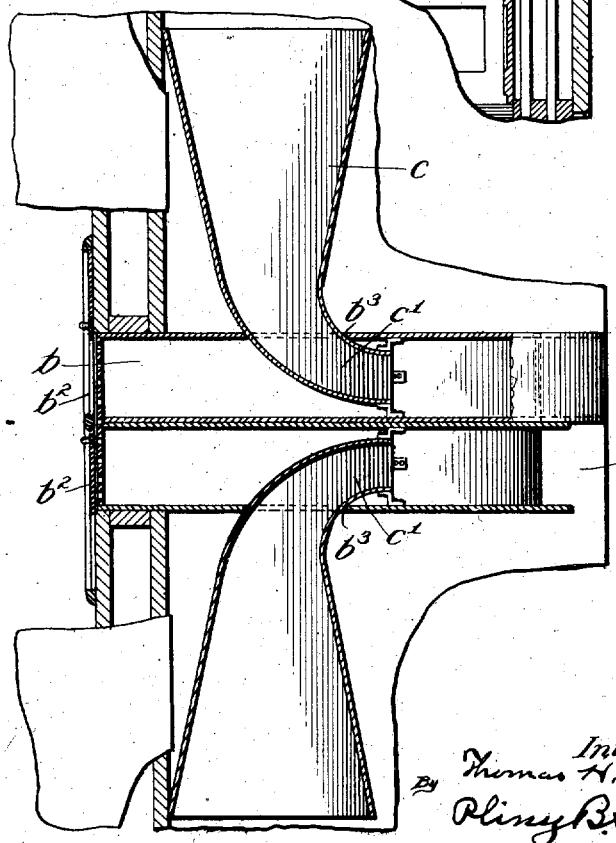
Figure 3:
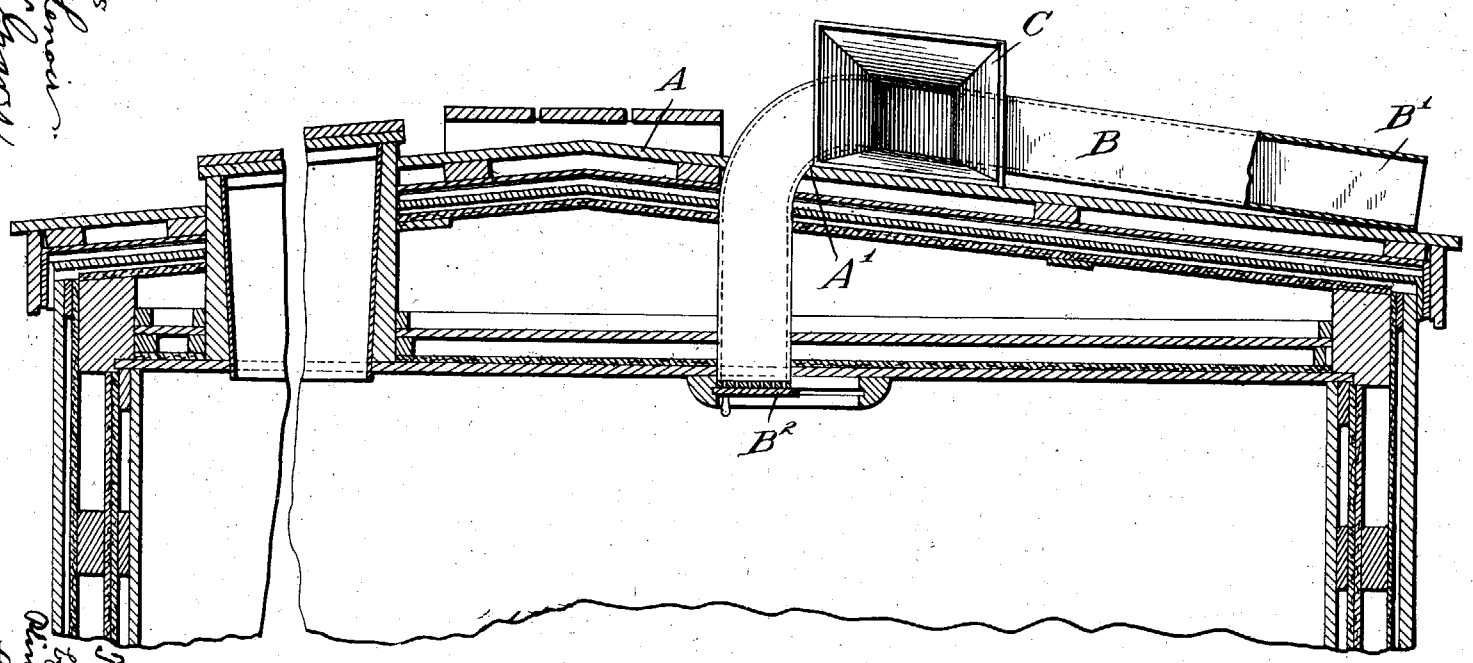

Figure 1 is a transverse sectional view of a portion of a car, showing one form of my invention as applied thereto, a part of the ventilator being shown in section; Fig. 2 is a sectional view on the curved line 2—2 of Fig. 1; and Fig. 3 is a transverse sectional view of a refrigerator car, showing a form of my invention applied thereto.

Referring first to Figs. 1 and 2, an opening is made in the deck $a$ of the car, as shown in $a'$, and a main conductor $b$ is placed along the roof $a^2$ of the car with its inner end in said opening. The outer portion of the conductor is preferably curved to conform substantially to the shape of the roof and in its preferred form is made square in cross-section. The discharge end $b'$ of the conductor is consequently located near the edge of the roof and faces downward. Therefore rain and snow cannot enter the conductor at this point. The conductor is preferably provided with a damper $b^2$ at its inner end. A cowl $c$ is located along the side of the deck and on the roof, with its axis parallel with the axis of the car and substantially perpendicular to the axis of the conductor $b$. It is made flaring at its front end and is provided with a curved contracted end $c'$, leading into the side wall of the conductor $b$ at the point $b^3$. This contracted end is curved around in such position that its opening is directly in the center of the conductor $b$ and points toward its outer end $b'$.

Supposing the car to travel in the direction in which the flared end of the cowl points, it will be obvious that air will be gathered by the cowl and discharged through the end $c'$ into the conductor $b$. This air will be forced through the conductor from the end of the cowl to the outer end $b'$ of the conductor and its aspirating action will obviously take with it air from the other portion of the conductor, which communicates with the car and is controlled by the damper $b^2$. The current of air flowing out of the mouth of that one of the discharge ducts into which the forward cowl discharges impinges against the body of outer air, which, owing to the onward movement of the car, deflects said outflowing current across the mouth of the companion duct into which the rear cowl discharges. The deflection is, however, more or less gradual, the momentum and pressure of said outflowing current serving to push the outer body of air away from the mouths of both ducts, so that a pronounced exhausting or suction effect is produced in the lee of the said outflowing current immediately in front of, and in, the mouth of the rear duct. This induces a pronounced outflow of air from the interior of the car through the latter duct, so that the two ducts coöperate to ventilate the car. Of course, inasmuch as the construction and arrangement of the two halves of the ventilator are symmetrical, considered with reference to the two directions in which the car may travel, it will be obvious that both halves of the ventilator will be in effective operation whichever direction the car travels. It will be readily understood that this operation will result in the effective ventilation of the car and that the construction is of such a nature that foreign substances cannot enter the car. Although cinders can be blown into the cowl, they will be immediately discharged at the outer end of the conductor, and there will be no possibility of their being introduced into the car.

It will be observed that a ventilator constructed upon the principal set forth above is very efficient in operation, is free from the objection of introducing foreign matters into the car, and is very simple in construction. Having no moving parts it cannot easily become inoperative, and, being entirely stationary upon the car, it cannot readily be displaced.

Fig. 3 illustrates one form of my invention as applied to refrigerator-cars. It could be applied in the same or a similar manner to fruit and vegetable cars. In this view the roof A is provided with a perforation A′ for the main conductor B of the ventilator, which slopes along the roof and has an outlet at B′. A damper $B^2$ is provided within the car. A cowl C of similar structure to that shown in the other figures is located outside the car and connected with the conductor B, as described above.

Although I have illustrated and described particular embodiments of my invention, it will be obvious that the latter is not strictly limited to the details thereof.

Having thus described my invention, I claim as new and desire to secure by Letters Patent—

1. A ventilator having two cowls provided with flaring ends pointing in opposite directions and each being provided with a contracted curved end, and a pair of conductors into which said contracted ends lead, said conductors being curved downwardly at their outlet ends.

2. The combination with a car, of a ventilator having a conductor leading from the deck of the car and curving along the roof thereof, and a cowl extending longitudinally of the car and located on the roof thereof, said cowl having a contracted end entering the conductor and extending in an outward direction from the body of the cowl.

3. The combination with a car, of a ventilator having a conductor leading from its deck and curving along the roof of the car so that its outer end points in a downward direction, and a cowl extending longitudinally of the car upon the roof thereof and having a flaring end pointing toward the front end of the car, said cowl also being provided with a contracted end leading into the conductor and pointing toward the outer end thereof, said conductor and cowl being rigidly mounted upon the roof of the car.

4. In combination with a car, a plurality of eduction conduits communicating with the interior of the car and discharging externally side by side and substantially at right angles to the traveling movement of the car, and a pair of oppositely facing cowls each having its larger end facing towards one end of the car and its smaller end discharging within a corresponding one of said conduits and in a direction towards the outer discharge end of the latter, the discharge end portions of said conduits being unobstructed and freely exposed to the sweep of the external cross drafts induced by the travel of the car.

5. In combination with a car, a plurality of eduction conduits communicating with the interior of the car and discharging externally side by side in the same non-forwardly direction considered with reference to the direction of travel of the car, the discharge end portions of said conduits being unobstructed, arranged in immediate juxtaposition to each other, terminating coincidently, and freely exposed to the external cross drafts induced by the travel of the car, and a pair of oppositely facing funnel-shaped cowls, each having its larger end facing towards one end of the car and its small end projecting freely within a corresponding one of said conduits and arranged to discharge in a direction coincident with the direction of that part of the conduit into which it extends.

6. In combination with a car, a plurality of eduction conduits communicating with the interior of the car and having their discharge ends arranged side by side, terminating coincident with each other, opening downwardly and substantially at right angles to the direction of movement of the car so that their discharge ends are exposed to cross drafts while the car is in motion, a pair of oppositely facing funnel-shaped cowls, each having its larger end facing towards one end of the car and its small end extended and discharging within a corresponding one of said conduits and deflected to deliver in a direction coincident with the direction of that part of the conduit in which it extends.

7. In combination with a car, a pair of eduction conduits communicating with the interior of the car and having their outer discharge ends arranged side by side, coincident with each other and at right angles to the direction of movement of the car, a pair of oppositely facing funnel-shaped cowls, each having its larger end facing towards one end of the car and its smaller end extending into and discharging within a corresponding one of said conduits and in a direction towards the discharge end of the latter, the smaller discharge ends of said cowls terminating within and at substantial distances from the discharge ends of their respective conduits.

8. In combination with a car, a plurality of eduction conduits communicating with the interior of the car and discharging externally side by side in a non-forwardly direction, the discharge end portion of said conduits being unobstructed, arranged in juxtaposition to each other, terminating coincidently and exposed to the external cross drafts induced by the travel of the car, and a funnel-shaped cowl having its larger end facing towards one end of the car and its smaller end extending within the forward one of said conduits and discharging at a point within the latter intermediate the length of the conduit.

THOMAS H. GARLAND.

Witnesses:
PLINY B. SMITH,
EMILIE ROSE.